Oct. 26, 1971    ISAO YAMAGUCHI ET AL    3,615,137
FOCUSSING DEVICE FOR OPTICAL SYSTEM

Filed Oct. 9, 1967    2 Sheets-Sheet 1

INVENTORS
ISAO YAMAGUCHI AND
BY TASUSHI KITANOSONO

ATTORNEY

Oct. 26, 1971   ISAO YAMAGUCHI ET AL   3,615,137
FOCUSSING DEVICE FOR OPTICAL SYSTEM
Filed Oct. 9, 1967   2 Sheets-Sheet 2

Fig. 7"

INVENTORS
ISAO YAMAGUCHI AND
BY TATSUSHI KITANOSONO.
ATTORNEY

United States Patent Office 3,615,137
Patented Oct. 26, 1971

3,615,137
FOCUSSING DEVICE FOR OPTICAL SYSTEM
Isao Yamaguchi and Tatsushi Kitanosono, Tokyo, Japan, assignors to Canon Camera Company Incorporated, Tokyo, Japan
Continuation-in-part of application Ser. No. 238,935, Nov. 20, 1962. This application Oct. 9, 1967, Ser. No. 678,475
Int. Cl. G01j *1/00*
U.S. Cl. 356—122                                3 Claims

ABSTRACT OF THE DISCLOSURE

The present invention provides a focussing device for focussing the image of an object in a focal plane comprising an objective lens movable relative to the focal plane, a current measuring device, and an electrical circuit including a source of voltage interconnecting the cell and the device, the focal plane of the photoconductive cell being of a photoconductive material having a property specific to the photoconductive material used, the current measuring device measuring the extreme value of the current flowing through the circuit for the extreme value of the resistivity of the cell when the total light rays focus to a sharp image on the cell.

---

This invention is a continuation-in-part of the application Ser. No. 238,935, filed Nov. 20, 1962, which is now abandoned.

The present invention relates to a focussing aid for use in optical systems, such as photographic cameras, telescopes, and the like, to ensure accurate and precise focussing of the objective lens on objects at varying distances.

Generally speaking, when the image of an object is projected by an optical system on a screen, the image of the object when in focus is of the smallest dimensions relative to the image of the same object when out of focus. It is to be noted that there are marked differences in the intensity of illumination corresponding to a redistribution on the image screen of the light rays as the image is brought from an unfocussed picture into a focussed picture, although the total luminous flux remains substantially unchanged throughout the focussing procedure. If a screen be considered as being made up of a plurality of small areas, as an image is brought into focus, certain of these areas will be more intensely illuminated while a corresponding number of others will receive less illumination. We have found that it is possible to arrange photoconductive material in a photoelectric cell in any number of ways selected depending upon the relationship between the conductivity of the specific photoconductive material utilized and the intensity of the incident light, with the effect that the conductance of the cell as determined between the electrodes changes as the distribution of light intensity departs from uniformity, so as to reach an extreme, that is, a maximum or minimum, conductance at the extreme departure thereof from uniformity which corresponds to precise focussing.

In accordance with our invention there is provided a focussing aid comprising a photoconductive cell having a light receiving surface; focussing means arranged to focus incident light on such surface; and means for displacing the cell and the focussing means relative to each other to focus on the surface images of objects at different distances from the focussing means; a source of voltage being connected across the cell, and means being provided responsive to current flowing through the cell. The photoconductive cell is such that its response to a given light flux incident on a relatively small portion of the light-receiving surface of the cell is substantially independent of the location of such portion of the light-receiving surface, its response to a given total light flux on the light-receiving surface tends to an extreme value attained when the total light flux is focussed to a sharp image on the surface.

According to another feature of our invention there is provided a focussing aid comprising the cell as above detailed in which the cell comprises a pair of electrodes and photoconductive material electroconductively connecting the electrodes disposed therebetween for exposure of a surface of the material to image-forming light, the electrodes and the photoconductive material being so disposed relative to one another, having regard to the material utilized and to the relationship between its conductivity and the intensity of the light incident thereupon, that the conductance of the cell is dependent on the distribution of the intensity of illumination over said surface, the conductance having an extreme value for maximum departure of the distribution from uniformity, and thus, for accurate focussing of an image on the surface.

The material used and its surface may have the form of a single current path, or be divided to provide a plurality of current paths all extending between the electrodes, each of a width much less than its length, and the photosensitive material having a conductivity which is not simply directly proportional to the intensity of illumination thereupon. On the other hand, the electrodes may be closely spaced with the photoconductive material disposed therebetween as a strip of which the width at any point is much less, in the direction of spacing, than the length of the strip, and the photosensitive material may have a conductivity which is not simply inversely proportional to the intensity of illumination incident upon it.

In a photoconductive cell comprising a semiconductor body of a substance such as cadmium sulfide disposed between two electrodes, a beam of light incident upon a cell surface causes the electrical resistance of the semiconductor body and hence the magnitude of any electric current passing through the cell to vary with variation of the incident light beam. The characteristic of the varying electrical resistance has a relationship not only with the total luminous flux incident upon the semiconductor body but also to the luminous intensity of luminous flux per unit area of the light, and the relationship is expressable by $$R^\circ = \frac{k}{I^e}$$

where $R^\circ$ denotes the resistivity of the photosensitive material, $I$ the luminous intensity, and wherein $e$ and $k$ are constants specific to the photoconductive material.

It is an object of our invention to provide a structurally simple and easily operated focussing aid for use with optical instruments to detect the focussing precisely and without difficulty, with greater precision than can be attained with devices which utilize direct observation of he image for purposes of focussing.

It is another object of the invention to provide an automatic device for focussing optical instruments, such as photographic cameras, by using the focussing aid of our invention with servo operated focussing means.

Other objects, advantages and features of this invention will come more apparent from the following description of illustrative embodiments in conjunction with the drawings in which.

Figure 1:
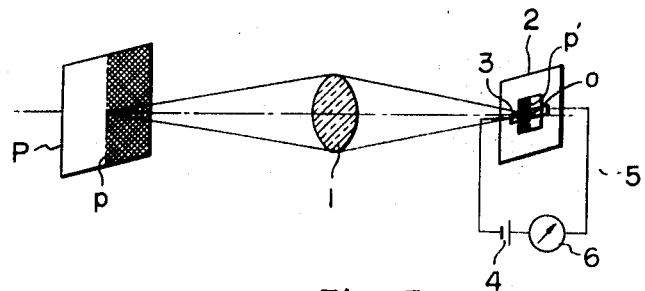
FIG. 1 is a diagrammatic illustration of the arrangement of the components of the focussing aid in accordance with the invention.

Referring to the drawing, 1 designates an objective lens movable in either directions of the axial line thereof, 2 a definite focal plane, 3 a photoconductive cell lying in the focal plane to receive an image from the objective lens 1, 4 an electrical source connected in an electrical circuit 5 with the photoconductive cell 3, and a galvanometer 6.

Taking for example a simplified form of invention shown in FIG. 1 for illustrative purpose, let us consider an object P having boundary line or contrast line $p$ dividing light and dark parts which line lies on the axis of the lens. There will be a corresponding contrast line $p'$ in the image on the surface of cell 3. Examining the distribution of the rays of light of the image on the focal plane, it is noted that the luminous intensity of the focussed image plotted as curve C in FIG. 2 appears sharply stepped, while the luminous intensity of the unfocussed image plotted as curve C' in FIG. 3, shows a gradual change, indicated by the sloped curve.

Let the intensity of illumination of the least illuminated portion of the image surface be $I_d$ and that of the most illuminated portion be $I_b$ and further let $$I_b = mI_d \text{ when } m > 1$$

Figure 2:
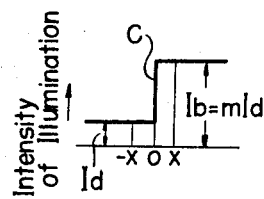
FIGS. 2 and 3 are curves indicative of different luminous intensities in the image plane when the image is in and out of focus, respectively.
Figure 3:
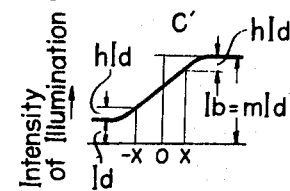

Referring to FIG. 3 having the curve as a plot of the intensity of illumination of the image lying out of focus, and suppose an origin O at which the ordinate intersects the curve at its midpoint. There will be a similar origin O at the step of the curve of FIG. 2.

Referring to FIGS. 2 and 3, and assuming the illumination intensity to be $I_x$ and $I_{-x}$ respectively at locations lying away from origins O by $x$ and $-x$, it may be noted in FIG. 2, that $$I_x = I_b, \text{ and } I_{-x} = I_d$$

and in FIG. 3, that $$I_x = I_b - hI_d \text{ and } I_{-x} = I_B + hI_d$$

Figure 4:
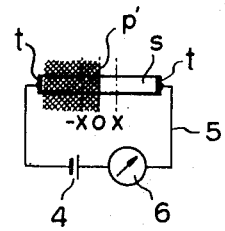
FIGS. 4 and 5 are diagrammatic representations of photoconductive cells of simple structure showing light and dark patches of incident image.

Now, let us consider such case, as shown in FIG. 4 as Example 1, in which the photoconductive cell receiving such illumination consists of a relatively elongated semiconductor body $s$ having electrodes $t$ at the opposite ends thereof, and the boundary line $p'$ between the strongly and weakly illuminated portion falls perpendicularly to the direction of electrical current within the semiconductor body $s$. The total resistance of the semiconductor body may be then considered to be the sum of a multiplicity of very small resistance elements within the semiconductor body connected in series with respect to the direction of electrical current therethrough.

Figure 5:
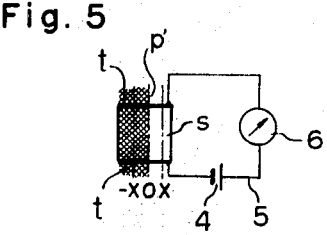
Figure 6:
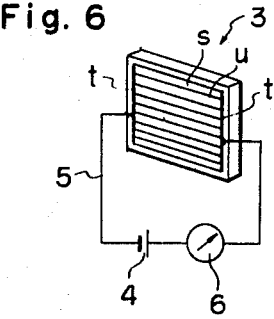
FIGS. 6 to 9 illustrate forms of the photoconductive cell of various configurations for use in the invention.
Figure 6:
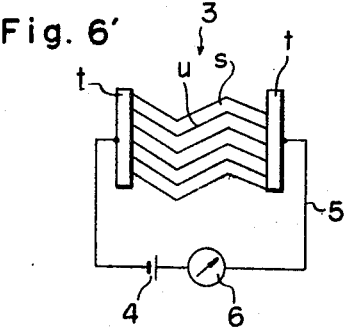
Figure 6:
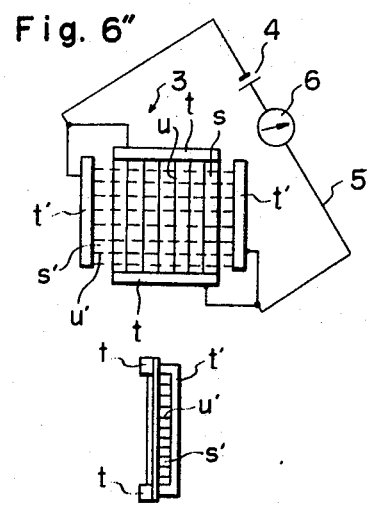

Consider two resistance elements of length $dx$ and resistance $dr_1$ and $dr_2$ at locations respectively $-x$ and $x$ in FIGS. 4 and 5 and let $dR^1$ be the resistance of the sum of the two elements on the two sides of the origin where the image is in focus, and let $dR^{11}$ be the resistance of the sum of two corresponding elements when the image is out of focus.

Then from the equation:

$$R° = \frac{k}{I^e}$$

there is obtained $$dR^1 = dr_1{}^1 d + r_2{}^1 = \frac{kdx}{I_d{}^e A}\left[1 + \frac{1}{m^e}\right]$$

where A is the cross-sectional area of the photosensitive semiconductor material.

$$dR^{11} = dr_1{}^{11} + dr_2{}^{11} = \frac{kdx}{I_d{}^e A}\left[\frac{1}{(1+h)^e} + \frac{1}{(m-h)^e}\right]$$

and the difference $\Delta = dR^{11} - dR^1$ is $$\Delta = \frac{kdx}{I_d{}^e A}\left[\left(\frac{1}{(1+h)^e} - 1\right) + \left(\frac{1}{(m-h)^e} - \frac{1}{m^e}\right)\right]$$

It can be found by expansion of the above formula that the question whether $\Delta > O$ or $\Delta < O$ is determined by the value of $$\left(\frac{1}{m^e + 1} - 1\right).$$

Since $e > 0$ and $m > 1$, then $\Delta < 0$ at all times.

If the total resistance present between two electrodes in such an elongated cell is $R^1$ when the image is in focus, and $R^{11}$ when it is out of focus, where $R^1 = \Sigma dR^1$ and $R^{11} = \Sigma dR^{11}$, then $R^{11} < R$. Thus the resistance of such a cell is greater when the image is in focus which confirms what is found in practice. Presently available materials have $e$-values approximately in the range 0.6 to 0.8, but the use of materials having $e$-values over 0.8 in series arranged coils is desirable when this becomes possible. With a cell of such material, the resistance of such a cell is greater; the current flowing being less when the image is in focus than when out of focus.

Let us then consider another case, as shown in FIG. 5 as Example 2, in which boundary line $p'$ between the strongly and weakly illuminated portions of the image on the photoconductive cell lies parallel to the direction of the electrical current flow within semiconductor body $s$. The cell in this case can be considered as comprising a parallel arrangement of a plurality of resistances of many narrow width portions connected in parallel between the two electrodes.

Again denoting pairwise these resistances at locations of length $dx$ and resistance $dr_1$ and $dr_2$ away from the origin O by $x$ and $-x$, on the abscissa. Then $$\frac{1}{dR^1} = \frac{1}{dr_1} + \frac{1}{dr_2} = \frac{1}{\frac{kdx}{I_d{}^e A}} + \frac{1}{\frac{kdx}{I_b{}^e A}} = \frac{I_d{}^e A}{kdx}(1 + m^e) \text{ and}$$

$$\frac{1}{dR^{11}} = \frac{1}{dr_1{}^{11}} + \frac{1}{dr_2{}^{11}} = \frac{1}{\frac{kdx}{A(I_d + hI_d)^e}} + \frac{1}{\frac{kdx}{A(I_b - hI_d)^e}}$$

$$= \frac{I_d{}^e A}{kdx}\left[(1+h)^e + (m-h)^e\right]$$

and the difference in conductivity in and out of focus of $\Delta^1$ is given by $$\Delta^1 = \frac{1}{dR^{11}} - \frac{1}{dR^1} = \frac{I_d{}^e A}{kdx}\left[(1+h)^e + (m-h)^e - (1+m^e)\right]$$

the sign of $\Delta^1$ being determined by the value of $$eh(1 - m^{e-1})$$

If the total resistance present between two electrodes is $R^1$ when the image is in focus and $R^{11}$ when it is out of focus, where $$\frac{1}{R^1} = \Sigma\frac{1}{dR^1} \text{ and } \frac{1}{R^{11}} = \Sigma\frac{1}{dR^{11}}$$

it is known that the sign of $$\frac{1}{R^{11}} - \frac{1}{R^1}$$

i.e., whether $$\frac{1}{R^{11}} - \frac{1}{R^1}$$

is greater or less than O, is determined by the value of $\Delta^1$. Now $\Delta^1$ with $e$ as shown in the above equation, and examination discloses that if $e>1$, so $\Delta^1<0$, therefore $$\frac{1}{R^{11}}<\frac{1}{R^1}$$

if $e=1$, so $\Delta^1=0$, therefore $$\frac{1}{R^{11}}=\frac{1}{R^1}$$

if $e<1$, so $\Delta^1>0$, therefore $$\frac{1}{R^{11}}>\frac{1}{R^1}$$

It follows therefore that the passage of electric current through the photoconductive cell when $e>1$ is at the maximum when the image is in focus; it does not vary if $e=1$ whether the image is in or out of focus, and if $e<1$ is at a minimum when the image is in focus. Known photoconductive materials have $0<e<1$, but it should be noted that materials having $e>1$ may be used to advantage in accordance with Example 2 if and when they come to hand, but those of $e=1$ may not be used at all. This, so far as cells arranged as in Example 2 are concerned, the use of material having $e=1$ should be avoided, and $e$-value should be deliberately made unequal to 1.

As is to be noted, the above discussions are based on a consideration of the most simplified boundary line between the strongly and weakly illuminated portions of the surface of an object where the image of the line is formed lying at right angle or parallel to the direction of electrical current within the photoconductive cell. Similar discussion may be had where the image formed of the boundary line between the strongly and weakly illuminated portion lies obliquely to the direction of electrical current within the photoconductive cell, since such boundary line may be understood to be a composite one consisting of those elements at right angles to and those parallel to the direction of electrical current. Similar discussion also may be had as to cases where the images are patterns of black stripes on a white base, or white stripes on a black base, or various other complicated patterns.

The focussing aid in accordance with the invention utilizes the results so far discussed and described above, and renders possible knowing when accurate focussing is completed by longitudinally moving lens system 1 and to register or indicate by the galvanometer 6 an extreme value, which extreme value may be either a maximum or a minimum depending on the specific photoconductive cell utilized.

Figure 7:
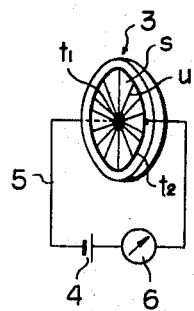
Figure 7:
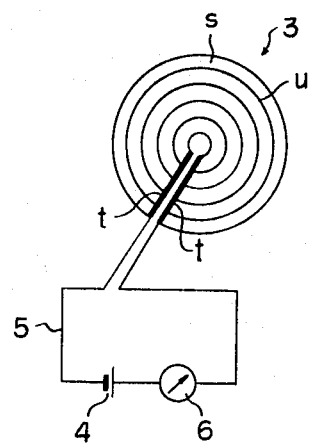
Figure 7:
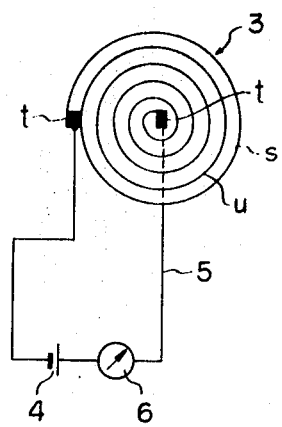

Referring to FIGS. 6 to 9, there are shown a variety of designs of the photoconductive cell according to the invention which may be used as shown in FIG. 1. The forms of the photoconductive cell illustrated in FIGS. 6 and 6' have a semiconductor body $s$ longitudinally divided into a plurality of layers of strata by a plurality of insulating walls $u$, being the equivalent of the form of a plurality of simple cells of the kind illustrated in FIG. 4 arranged in parallel, the current following a plurality of narrow elongated paths between the electrodes $t$. The cell illustrated in FIG. 6" has two individual photoconductive bodies $s$ and $s'$ with insulating walls $u$ and $u'$ of the type shown in FIG. 6, arranged mutually orthogonally to each other to detect blurring of the contrast lines of the image appearing in two or more directions, for use in the type of Example 1. The form illustrated in FIG. 7 has placed between a central electrode $t_1$ and a peripheral electrode $t_2$, a semiconductor body $s$ having radial insulators $u$, this form as also the forms of FIGS. 7' and 7" being variations on the form illustrated in FIG 6; FIG. 7' being a coaxial arrangement of semiconductor bodies $s$, while in FIG. 7" the semiconductor body is a spiral. The semiconductor body or bodies in the forms of FIGS. 7, 7' and 7" is or are arranged such that a part thereof lies substantially orthogonal to the contrast lines of image whatever their direction.

Figure 8:
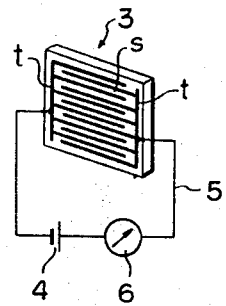

The form illustrated in FIG. 8 has, interspaces between two interleaved grid or comb electrodes $t$ for a flat semiconductor body $s$, and is for use in cases of the type of Example 2. The interleaved electrodes form a plurality of short wide current paths parallel of body $s$, as though having a number of the simple cells of FIG. 5 connected in parallel, as above discussed under Example 2.

Figure 9:
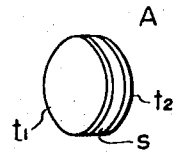

The photoconductive cell illustrated in FIG. 9 has a semiconductor body $s$ in the interspace between transparent electrode $t_1$, or a translucent electrode of metal netting or the like and electrode $t_2$, and is used with light rays made incident in the direction shown by the arrow in FIG. 9B. The cell will operate as discussed in Example 2.

Figure 10:
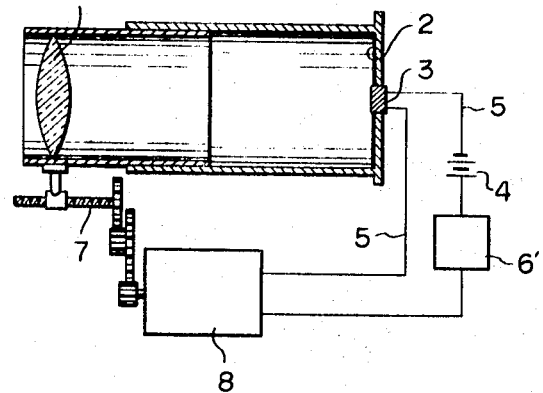
FIG. 10 is a diagrammatic representation of an automatic focussing apparatus for an optical instrument in accordance with the invention.
Figure 10:
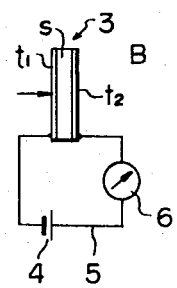

FIG. 10 is illustrative of a form of apparatus utilizing the focussing aid of the present invention whereby automatic focussing is possible and practical. The apparatus includes a moving mechanism 7 in the form of a screw and travelling nut in association with servo-motor 8 for the longitudinal adjustment of objective lens 1, and a controlling device 6' in lieu of the galvanometer for controlling the operation of the servo-motor 8. The servo-motor will be operated in response to signals of the controlling device 6' developed by changes in the current flowing in the cell circuit, the servo-motor operation being stopped when the flow of current reaches an extreme value as determined by the type of cell used. The objective lens 1 will then be in its in-focus position.

The control device can readily be constructed by those skilled in the art to cause the lens to be moved by the servomotor 8 in response to changes in the current flowing through the cell 3 in the direction to approach the maximum or minimum reading and then to stop the movement when this value has been reached.

The preferred cells illustrated are of prismatic shape and have illuminated surfaces the dimensions of which are greater than the thickness of the cell.

It will be understood that this invention is not limited to the specific materials, figures, etc., and other details described above and illustrated in the drawing, but can be carried out with various modifications without departing from the scope of the invention, as defined in the appended claims.

What is claimed is:

1. Focussing device for focussing the image of an object in a focal plane comprising:

a lens movable perpendicular to the focal plane;

a photoconductive cell having a photosensitive surface in the plane corresponding to the focal plane in optical alignment with the lens;

an electrical circuit including a source of voltage for the cell;

control means in said circuit for generating an electrical signal in response to the intensity distribution of the light rays falling on the photoconductive cell through the lens; and means responsive to the electrical signal generated for moving the lens perpendicular to the focal plane so as to cause the light rays from the object to be focussed into a sharp image on the photosensitive surface of photoconductive cell; the movement of said lens being determined by the specific relationship between resistivity R of the photoconductive cell and the intensity distribution of illumination I, i.e., $R=K/_Ie$ wherein K and $e$ are constants specific to the photoconductive material used, said photoconductive material having an $e$-value unequal to 1.0; the degree of movement of said lens by said signal responsive means corresponding to an extreme value of the resistivity R of said photoconductive material when the image of an object focussed is in focus in the focal plane of the lens.

2. Focussing device according to claim 1, wherein the photoconductive material has an *e*-value of approximately in the range of 0.6 to 0.8.

3. A focussing device according to claim 1, in which a second photoconductive cell overlaps the cell, the photoconductive material of one of the cells being at least semitransparent, each electrode of the one cell being frictionally connected with a respective one of the electrodes of the second cell, and each cell comprising a plurality of current paths extending substantially orthogonally across the current paths of the other cell.

References Cited
UNITED STATES PATENTS

| | | | |
|---|---|---|---|
| 1,447,646 | 3/1923 | Cherry | 338—17 |
| 2,134,757 | 11/1938 | Goldsmith | 88—1 HF |
| 2,937,353 | 5/1960 | Wasserman | 338—15 |
| 2,995,741 | 8/1961 | Kazan | 88—1 HF |
| 2,999,436 | 9/1961 | Faulhaber | 88—1 HF |
| 3,013,232 | 12/1961 | Lubin | 338—15 |
| 3,188,476 | 6/1965 | Karmiggelt et al. | 338—15 |

WILLIAM L. SIKES, Primary Examiner